United States Patent

[11] 3,561,546

[72] Inventor Calvin B. Craig
 Dayton, Tex.
[21] Appl. No. 774,901
[22] Filed Nov. 12, 1968
[45] Patented Feb. 9, 1971
[73] Assignee Leo Horvitz
 Houston, Tex.

[54] METHOD OF AND APPARATUS FOR UNDERWATER GEOCHEMICAL EXPLORATION
2 Claims, 8 Drawing Figs.

[52] U.S. Cl............................................... 175/5,
 175/245; 23/230, 23/253
[51] Int. Cl............................................. E21b 9/20,
 E21b 25/00, G01n 23/04
[50] Field of Search......................................... 23/230
 (EX), 253, 73 (Inquired), 166 (Inquired), 175
 (Inquired); 175/5X, 6; 175/245

[56] References Cited
UNITED STATES PATENTS
3,299,969 1/1967 Inderbitzen................. 175/5

Primary Examiner—Morris O. Wolk
Assistant Examiner—R. M. Reese
Attorney—Charles E. Lightfoot ABSTRACT: A method of and apparatus for underwater geochemical prospecting by taking samples of the bottom formation and water at or immediately above the bottom. The method comprises taking samples simultaneously of the water at the bottom and of the earth formation immediately below at spaced apart locations for analysis to determine the concentration of significant hydrocarbon leakage products from subterranean petroleum deposits to be used in exploring for such deposits. The sample taking apparatus comprises a tubular body whose lower end is open and provided with means for penetrating the bottom formation and retaining a sample of the same in the body. The sample taker includes a piston movable upwardly from a lower position closing the lower end portion of the body to an upper position above when the body reaches a predetermined position at or close to the bottom during its downward travel to draw in a sample of water at or immediately above the bottom. The apparatus is adapted to be suspended by an operating cable and means is provided for adjusting the piston actuating means to allow predetermined setting of the apparatus to allow free fall of the body from a desired point of its downward travel before the body penetrates the bottom formation.

PATENTED FEB 9 1971
3,561,546
SHEET 1 OF 3
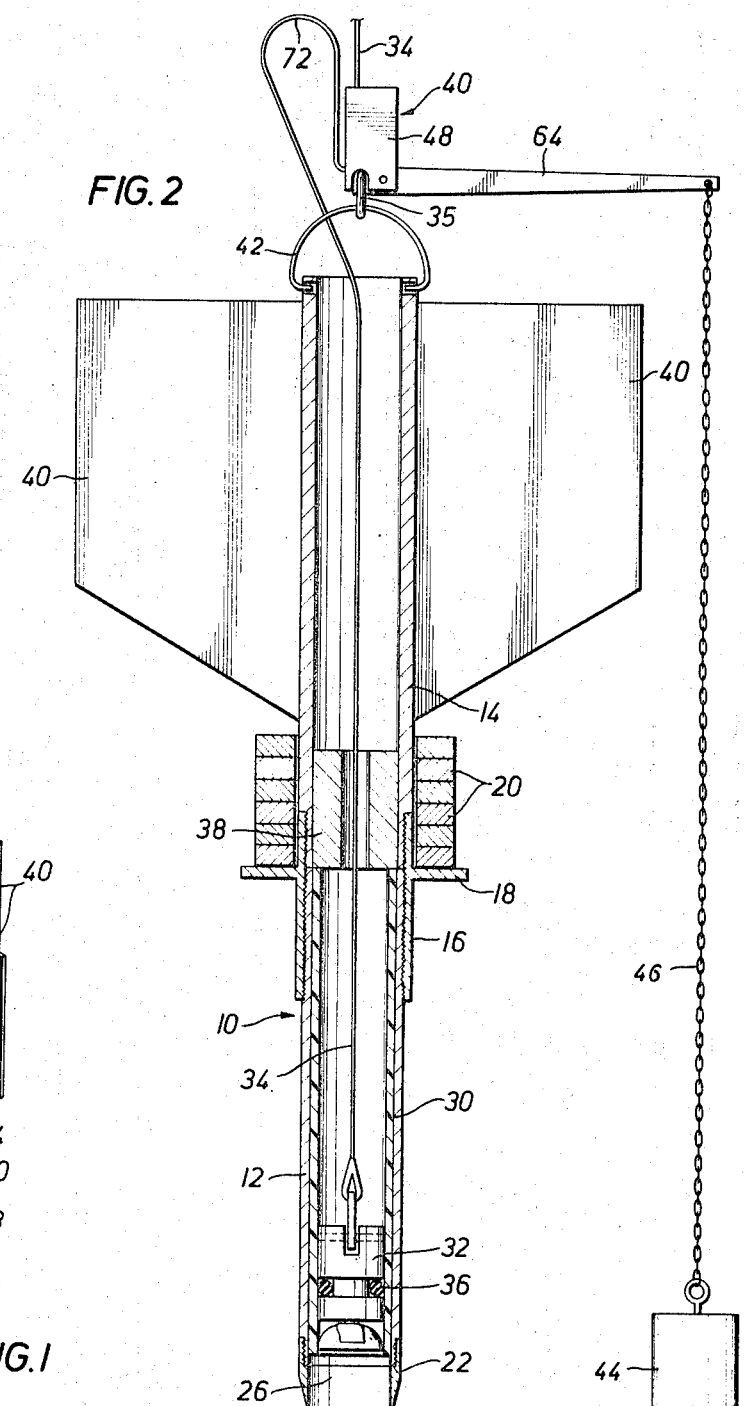
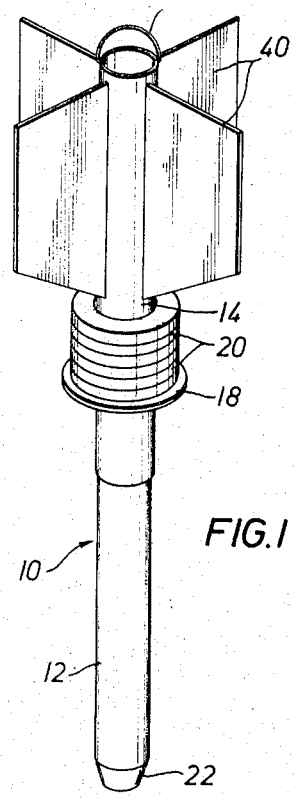
FIG.1
Calvin B. Craig
INVENTOR
BY
Charles E. Lightfoot
ATTORNEY Calvin B. Craig
INVENTOR BY
Charles E. Lightfoot
ATTORNEY

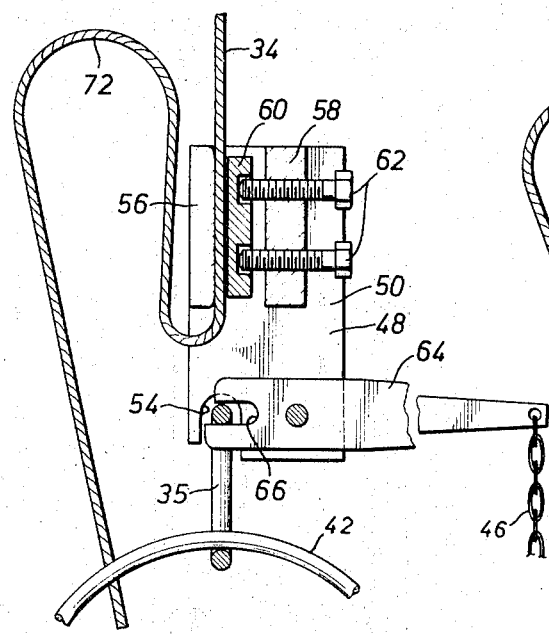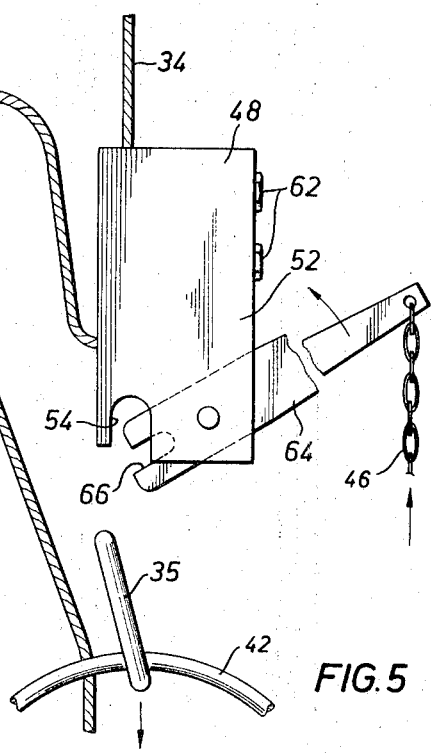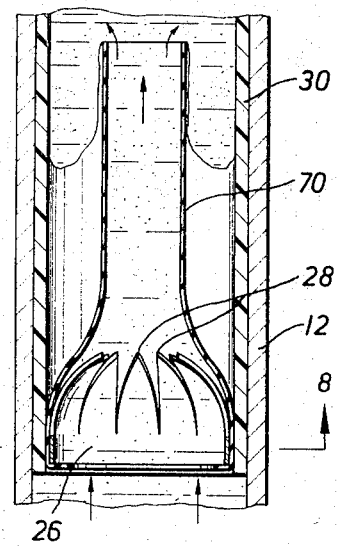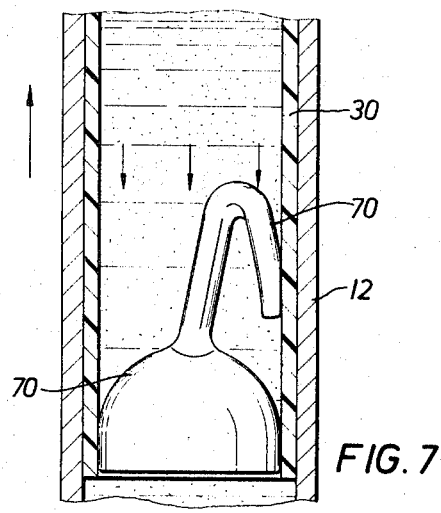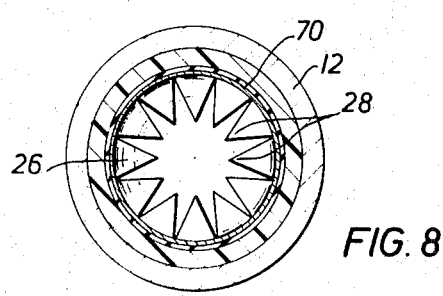

METHOD OF AND APPARATUS FOR UNDERWATER GEOCHEMICAL EXPLORATION

BACKGROUND OF THE INVENTION

In prospecting for petroliferous subterranean deposits by geochemical methods it has been proposed to take samples of soil at spaced locations throughout an area to be explored which are then subjected to analysis to determine the concentration of leakage products indicative of the presence of oil in a subterranean formation. The concentrations thus found are then correlated with sample location to provide information indicative of the location of petroliferous deposits.

The concentration of significant leakage products is relatively small and is usually expressed as parts per billion by weight of the sample taken.

Such methods of geochemical prospecting are described in prior patents, such as the Pat. to Horvitz 2,192,525, March 5, 1940, which discloses a method in which the concentration of hydrocarbons such as methane, and heavier hydrocarbons such as ethane and propane in soil samples are used to provide information as to the location of subterranean petroliferous deposits.

Another such method, depending upon the occurrence of hydrogen as a leakage product in the soil from subterranean petroliferous deposits is disclosed in the Pat. to Horvitz, 2,183,964, Dec. 19, 1939, and a similar method, in which use is made of carbon monoxide occurring in the soil is revealed in the Pat. to Horvitz 2,261,764, Nov. 4, 1941.

The taking of samples in the carrying out of geochemical prospecting methods of this kind is a relatively simple matter when the samples are obtained on land, it being merely necessary under ordinary conditions to enclose the samples in suitable containers, such as glass jars, as soon as possible to avoid undue loss of significant leakage products. The samples are usually taken at a depth of a few feet below the surface to avoid surface contamination.

The collecting of samples from submerged areas, however, presents a number of difficulties for which no convenient remedy has heretofore been discovered.

The rate at which significant leakage products escape from the formation depends upon the nature of the formation material. Thus, hydrocarbons which may conveniently be used for geochemical prospecting purposes are not retained in significant concentration in loose or sandy formations, while relatively large amounts are retained in more compact or clayey formations.

It has also been discovered that sediment or mud occurring on the bottom retains practically none of the significant leakage products, while substantial concentrations of the same are often encountered in the water at or close to the bottom. Such concentration is, however, rapidly lost as the distance above the bottom at which the water sample is taken increases. Thus, the occurrence of high concentrations of significant leakage products in the water at or immediately above a relatively porous bottom formation, such as sand, in which there is little or no concentration of such products, may indicate the presence of subterranean petroleum deposits, which would not ordinarily be suspected from an analysis of the bottom formation alone. On the other hand, the water at or immediately above the bottom where the bottom formation is of a more compact nature, such as clay, may contain no significant amounts of the leakage products sought, while the bottom formation itself may contain relatively high contractions of such products retained therein, in which case analysis of the leakage product content of the water would have little or no significance.

It becomes important therefor, in geochemical prospecting of submerged area, that samples of both the bottom formation and the water at or immediately above the formation be taken simultaneously, when it is desired to make a thorough and complete investigation of the presence of subterranean petroleum deposits in such areas.

SUMMARY OF THE INVENTION

Briefly described, the method of the present invention comprises the geochemical exploration of submerged areas by the taking of samples of the formation below the bottom at spaced apart locations and of the water at or immediately above the bottom at each such location. The samples thus obtained are then analyzed to determine the concentration therein of significant hydrocarbon leakage products, such as ethane and propane, and the results of such analyses are correlated with sample location whereby information is obtained concerning the presence or absence of subterranean petroleum deposits and the possible location of the same in or adjacent such an area.

The method may include the taking of samples of the formation and the water simultaneously in one operation, or the taking of separate samples of the water and formation at each location by separate operations.

The apparatus of the invention comprises sample taking mechanism including an elongated tubular body adapted to be lowered through the water for engagement with the bottom and having means at its lower end shaped to penetrate the bottom formation upon impact therewith. The lower end portion of the body is also provided with means for retaining a sample of the material of the formation therein to permit retrieval of the sampler without losing the sample.

The body may be furnished with a removable liner, which may be formed of flexible plastic material positioned to receive the sample and which may be conveniently removed from the body with the sample contained in the liner.

The sample taking apparatus includes means for closing the lower end of the body during its downward movement in the water, and which is operated to allow the inflow of water into the body when the body reaches a predetermined point at or close to the bottom to obtain a sample of the water immediately above the bottom and to retain the same, together with any sample of the formation taken upon penetration of the apparatus with the bottom formation. The closure means of the apparatus may take the form of a piston or plunger movably disposed in the body for longitudinal movement therein from a lower position closing the lower end portion of the body to an upper position above said lower end portion, which plunger is connected to a cable extending upward in the body and upwardly therefrom to the surface. Releasable latching means is provided for releasably connecting the cable to the upper end of the body, including means adjustably engageable with the cable to provide a loop or slack portion in the cable immediately above the body. The latching mechanism includes weight means holding the mechanism in a latched condition and which is adapted to engage the bottom upon lowering of the apparatus in the water to unlatch the mechanism to allow the sample taker to fall freely from a predetermined position above the bottom to cause the sample taker to penetrate the bottom formation.

The invention has for an important object the provision of a method of geochemical exploration of submerged areas including the taking of samples of the bottom formation at spaced locations in such an area and samples of the water at or immediately above the bottom at each such location.

A further object of the invention is to provide sample taking apparatus for the simultaneous taking of a sample of the bottom formation in a submerged area and a sample of the water immediately above the bottom.

A still further object of the invention is to provide means, in sample taking apparatus of the kind mentioned, for maintaining the apparatus in an empty, closed condition during its downward movement in the water and for opening the apparatus to the inflow of a sample of the water when the apparatus reaches a predetermined position of its downward travel to obtain sample of the bottom formation into the apparatus when the apparatus penetrates the formation.

BRIEF DESCRIPTION OF THE VIEWS OF THE DRAWINGS

FIG. 1 is a perspective view, on a reduced scale, of a preferred embodiment of the sample taker of the invention;

FIG. 2 is a vertical, central cross-sectional view of the sample taker of FIG. 1, showing the same in condition for use in the taking of a sample;

FIG. 4 is a detail view, partly in cross section, and on a somewhat enlarged scale, of the suspension and latching mechanism of the sample taking apparatus, showing the same in its latched position;

FIG. 5 is a view similar to that of FIG. 4, showing the latching mechanism in its released position;

FIG. 6 is a fragmentary, vertical, central, cross-sectional view, on an enlarged scale, of the lower end portion of the sample taking apparatus, showing the sample retaining means thereof in its sample receiving condition;

FIG. 7 is a view similar to that of FIG. 6, showing the sample retaining means in its sample retaining position; and FIG. 8 is a cross-sectional view, taken along the line 8—8 of FIG. 6, looking in the direction indicated by the arrows.

DETAILED DESCRIPTION OF A PARTICULAR EMBODIMENT OF THE INVENTION

Figure 3:
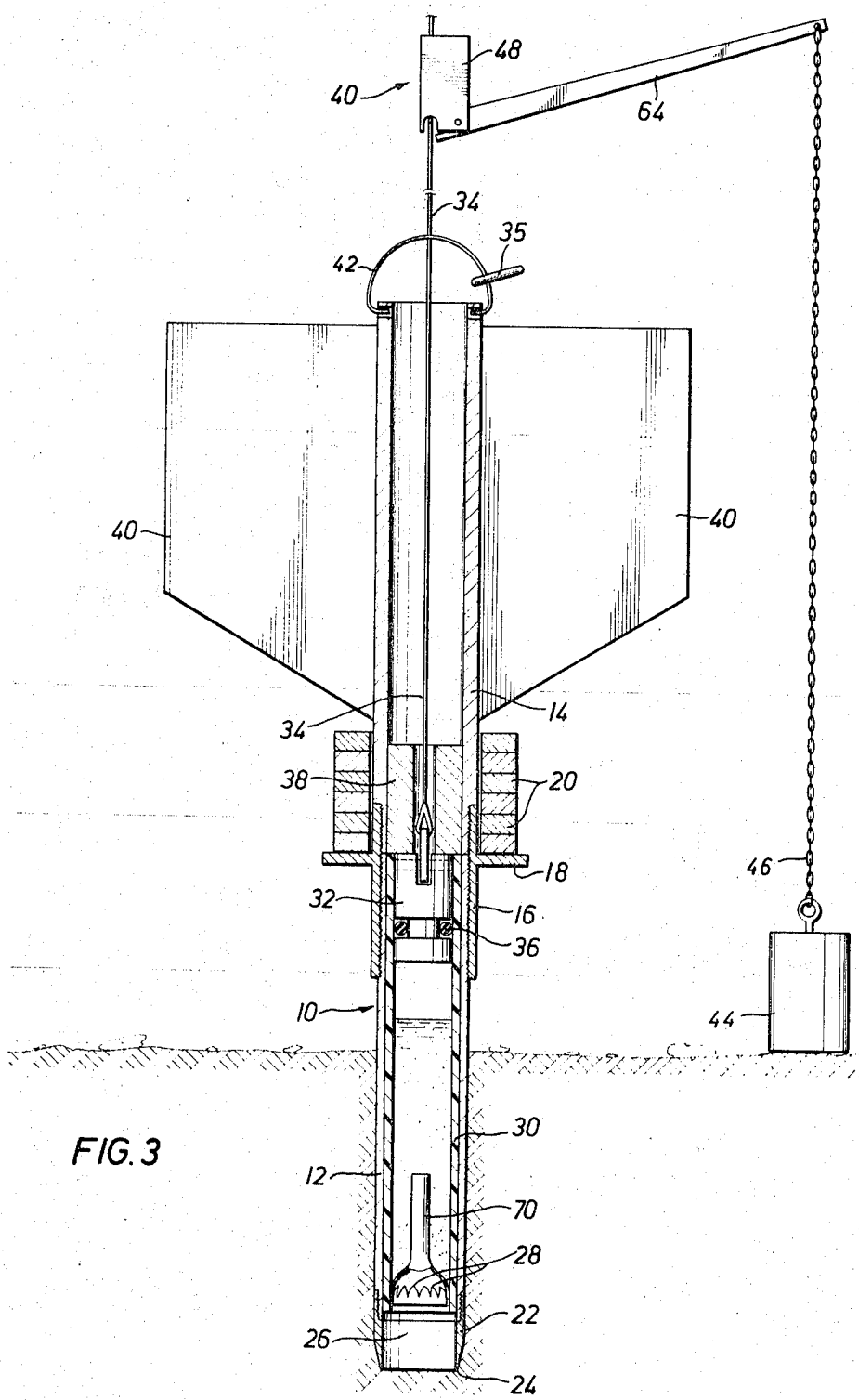
FIG. 3 is a view, similar to that of FIG. 2, showing the sample taker after the same has been dropped to the bottom to penetrate the formation, the parts being shown in the positions which they occupy when samples of the formation and the water immediately above the same have been obtained.

The sample taking apparatus of the invention comprises a tubular body or barrel generally designated 10, conveniently made up of a lower, formation penetrating and sample holding part 12 and an upper stabilizing part 14. The parts are connected together by a connector and weight carrying member 16 threadably attached to the upper end of the lower part and to the lower end of the upper part and which is formed with an external annular flange 18 providing a weight carrying table or support for removable weights 20 which may be of annular or other suitable shape.

At its lower end the body carries a penetrating shoe or cutter, in the form of a tubular extension 22, threadably attached to the lower end of the part 12 and having a sharpened lower end providing a cutting edge 24.

Within the lower end of the lower part a sample catcher 26 having inwardly and upwardly projecting flexible points or fingers 28 positioned to allow the upward movement of a formation sample into the body or barrel, but to prevent the sample from falling back, out of the same.

The lower part 12 has an internal liner 30, preferably formed of plastic which is closely fitted into the part 12 extending from the sample catcher to the table 18, and which is slidably removable from and reinsertable in the barrel when the extension 22 is removed.

Within liner 30 a piston or plunger 32 is slidably disposed, which is suitably connected to the lower end of an actuating cable 34, extending upwardly in and out of the upper end of the barrel. Suitable seal forming means, such as the O-ring 36 is carried by the piston, in an external annular groove provided for the same, to form a fluid tight seal between the piston and liner.

The upper part 14 has an inner tubular plug or stop 38 in its lower end, through which the cable 34 is freely extended and which serves as a stop to arrest upward movement of the piston 32.

Stabilizing fins 40 are provided on the upper part 14, extending radially therefrom to maintain the body substantially upright during its downward travel in the water. At its upper end the body has a bail 42, or the like, by which the body is suspended by the cable 34 through the intermediation of releasable latching mechanism, generally designed 42, illustrated in detail in FIGS. 4 and 5, adapted to be held in latched position by a weight 44, connected thereto by a chain or other flexible connector 46, and positioned for engagement with the bottom to release the latching mechanism to allow free fall of the body when the apparatus reaches a predetermined position above the bottom.

The latching mechanism includes a latch body 48 of generally rectangular configuration which may conveniently be made up of spaced apart plates 50 and 52, each having a lower end notch 54 disposed in registration with the notch of the other plate to form a ring receiving notch through which an attaching ring 35 may be releasably extended. The latch body also has spacer blocks 56 and 58, seen in FIG. 4, positioned between the plates and fixedly secured thereto, in spaced apart relation, between which a cable clamp block 60 is provided with adjusting screws 62, threadably extended through the fixed block 58 and which are rotatable in engagement with the clamp block 60 to move the same toward and away from the fixed block 56. It will be apparent that, by this arrangement, the cable 34 may be extended between the plates 50 and 52, between the clamp block 58 and fixed block 56, as shown in FIG. 4, so that the latch body may be securely clamped to the cable at any desired location thereon.

The latching mechanism has a latch lever 64 pivotally mounted mediate its ends to the latch body between the plates thereof for vertical swinging movement, and which is formed at its inner end with a notch 66 positioned to be moved into and out of a position extending across the cable notches 54 of the plates 50 and 52. The latch lever 64 is connected at its outer end to the chain 46, whereby the lever will be held in its latching position by the weight 42 during the lowering of the apparatus in the water.

A ring 35 is attached to the bail 42, and may be disposed in the notches 54 of the plates 50 and 52 and in the notch 66 of lever 64 to releasably connect the latch body to the bail 42, as seen in FIG. 4.

The sample retaining means of the apparatus may include a thin walled flexible tubular element 70, formed of rubber or the like, which has its lower end portion stretched over the sample catcher 26 and which extends upwardly in the sleeve 30 therefrom, as shown in FIGS. 6 and 7. The element 70 is open at its ends and will allow an inflow of sample into the lower end of the sample taker through the sample catcher 26, but will collapse, as shown in FIG. 7, due to internal pressure in the sleeve 30 from above, upon upward retrieving movement of the apparatus to prevent the outflow of water or loose material, such as mud or sand from the sample taker.

In making use of the sample taking apparatus, the same is connected in its empty condition, with the plunger 32 in its lowermost position, to the cable 34, by clamping the latch body to the cable between the fixed block 56 and clamp block 58 at a predetermined location on the cable to form a cable loop or slack portion 72 of a desired length, depending upon the free fall distance through which it is desired to have the apparatus fall before impact with the bottom, and the ring 35 is inserted in the notch 66 of lever 64 in the position of the lever shown in FIG. 5, the lever being then moved to the position of FIG. 4 to latch the bale 42 to the latch body.

With the sample taker body thus latched to the latch body, the apparatus may be lowered in the water on the cable 34, the weight 42 being suspended on the chain 44 to hold the lever 64 in its latching position.

By suitably selecting or adjusting the length of the chain 46, the weight 44 may be positioned to reach the bottom at any desired distance in advance of the sample taker body, depending upon the distance which it is desired to have the same fall free for impact with the bottom. When the apparatus has been lowered to engage the weight 42 with the bottom further lowering of the same will result in movement of the lever 64 to its releasing position, shown in FIG. 5, whereupon loop or slack portion 72 of the cable 34 will be extended to allow the body or barrel of the sample taker to fall freely downwardly to penetrate the bottom.

Due to the sudden downward movement of the apparatus and its impact with the bottom under the influence of the weights 20, water at or close to the bottom and in the bottom formation, as well as a sample of the formation itself to the depth of penetration, will pass upwardly through the sample catcher 26 and retainer 70 into the sleeve 30, the plunger 32 being moved upwardly by the sample.

The apparatus with the sample thus taken is retrieved by pulling upwardly on the cable 34, which pulls the plunger 32 into engagement with the stop 38, after which the entire apparatus is lifted to the surface.

The sample may be removed from the apparatus by removing the tubular extension or penetrating shoe 22 and pulling out the sleeve 30 in which the sample is retained by the catcher 26 and retainer 70, whereupon the water, which will be on top of the formation sample may be poured out and the formation sample removed from the sleeve.

It will be apparent that the depth of penetration of the barrel will depend upon the nature of the bottom formation and the amount of weight carried by the apparatus and that the penetration may be regulated as desired by suitably changing the weights 20.

The method of the invention comprises the taking of samples of the water at or immediately above the bottom and a sample of the formation below at each sample location and it will be apparent that such sampling may be accomplished with other apparatus than that described above, such as by lowering a hose to the bottom and pumping up a sample of the water at the bottom, with or without a sample of the bottom formation, when such formation is of a soft character, such as sand. A sample of water may thus be taken at each sample location while a sample of the formation at each location may be separately obtained by other sample taking apparatus, such as a penetrating tube or core taker of any well known kind.

The samples thus retrieved may be analyzed in a well known manner to determine the concentration therein of significant leakage products which may then be correlated with sample location to provide information concerning subterranean petroliferous deposits in the area.

It will thus be seen that the invention provides a method and apparatus for obtaining samples of water and earth formation throughout an area to be explored for the presence of petroliferous deposits and by which samples may be easily and quickly collected in underwater locations.

The invention is disclosed herein in connection with a particular embodiment of the apparatus and a method of taking samples, which are intended by way of illustration only, it being evident that various changes can be made in the apparatus and in the particular steps of the method, within the spirit of the invention and the scope of the appended claims.

I claim:

1. Apparatus for simultaneously taking and retaining a sample of water at and of the formation beneath the bottom of a submerged area comprising:
   a. a tubular body open at its ends;
   b. a flexible cable;
   c. means forming a connection between the lower end of the cable and said body;
   d. means forming a releasable connection between the cable and body at a location to suspend the body on the cable and to form a loop in the cable between said lower end and said releasable connection to allow free fall of said body upon disconnection of said releasable connection;
   e. means on the body positioned for coaction with the water to hold the body in a substantially vertical position during downward movement of the body in the water;
   f. means for releasing said releasable connection when the body reaches a position spaced above the bottom a distance less than the free fall distance of said body;
   g. a thin walled flexible tubular member positioned in the lower end of said body; and
   h. means for holding the lower end of said tubular member open to allow an inflow of sample upwardly into the body through said tubular member, the upper end portion of said tubular member being closable under the influence of pressure exerted by the sample in the body on said upper end portion to prevent outward flow of the sample from the body.

2. The sample taking apparatus as claimed in claim 1 wherein said upper end portion of said tubular member is of smaller diameter than the internal diameter of said body and is spaced radially inwardly from the surrounding wall of the body to allow said upper end portion to be turned downwardly under the influence of the downward force of the sample in the body above said tubular member to close the tubular member against the outflow of sample therethrough from the body.